UNITED STATES PATENT OFFICE.

JAKOB SCHMID AND KARL JEDLICKA, OF BASLE, SWITZERLAND, ASSIGNORS TO SOCIETY OF CHEMICAL INDUSTRY IN BASLE, OF SAME PLACE.

BLACK TRISAZO DYE.

SPECIFICATION forming part of Letters Patent No. 583,634, dated June 1, 1897.

Application filed August 25, 1896. Serial No. 603,849. (Specimens.)

*To all whom it may concern:*

Be it known that we, JAKOB SCHMID and KARL JEDLICKA, citizens of the Swiss Republic, residing in Basle, Switzerland, have invented certain Improvements in the Manufacture of Black Substantive Cotton Dyestuffs, of which the following is a clear and complete specification.

We have found that the monoazo coloring-matters resulting from the combination of one molecule of an aromatic diazoaldehyde—as, for instance, diazobenzaldehyde—with one molecule of an amidonaphtholdisulfo-acid in acid solution, although of themselves of no value as dyestuffs, may, however, be utilized for the production of valuable black trisazo dyestuffs, when one molecule of the tetrazo derivative of a paradiamido base of the series of diphenyl—such, for example, as benzidin, tolidin, dianisidin, methylbenzidin, and ethoxybenzidin—is combined with one molecule of the said monoazo coloring-matters and one molecule of an aromatic amido compound—such, for example, as metaphenylenediamin, metatoluylenediamin, metaämidophenol, naphthylamins, alpha-naphthylamin-sulfonic acids 1.4, 1.6, and 1.7, beta-naphthylamin-sulfonic acids 2.5, 2.6, and 2.7, amidonigrotinic acids, amidonaphthols and their sulfo derivatives. These trisazo dyestuffs, which all contain three "diazo groups," are all dark powders of light bronze luster, they dye unmordanted cotton in tints varying from violet black to green black. The preparation of these new trisazo coloring-matters is preferably executed in three successive operations, comprising, first, the production of the monoazo coloring-matter derived from an amidonaphthol-disulfonic acid and an aromatic diazoaldehyde; second, the combination of one molecule of a such monoazo coloring-matter with one molecule of the tetrazo derivative of a paradiamido base of the series of diphenyl, and, third, the combination of one molecule of the intermediate product thus obtained with one molecule of an aromatic amido compound.

By way of example we will now describe the production of the black trisazo dyestuff derived from paradiazobenzaldehyde, amidonaphthol-disulfonic acid 1.8.3.6, tetrazodiphenyl, and metatoluylenediamin.

I. *Preparation of the monoazo coloring-matter derived from paradiazobenzaldehyde and amidonaphthol-disulfonic acid 1.8.3.6.*— 6.1 kilograms paramidobenzaldehyde are dissolved in water to which seventeen kilograms hydrocholoric acid of thirty per cent. have been added, the mixture being heated to boiling. The solution of paramidobenzaldehyde thus obtained is then cooled to a temperature comprised between 10° and 15° centigrade and diazotized by means of 3.5 kilograms of sodium nitrite. The solution of the diazo body is filtered, if necessary, and poured into an aqueous solution of sixteen kilograms amidonaphthol-disulfonic acid 1.8.3.6 and 2.7 kilograms of sodium carbonate at a low temperature. The mixture is allowed to stand for several hours, whereby the monoazo coloring-matter separates from the liquid in form of violet-black flakes.

II. *Preparation of the intermediate product.*—To the primary monoazo coloring-matter suspended in liquid are added twenty kilograms of sodium carbonate, whereby a blue-violet solution is obtained, which is cooled with ice at about 10° centigrade and mixed with the solution of tetrazodiphenyl prepared in the well-known manner from 9.2 kilograms benzidin, care being taken to agitate the liquid. The intermediate product is soon formed and precipitates as blue-black insoluble flakes. The reaction is completed after about one-half hour.

III. *Combination of one molecule of the intermediate product*

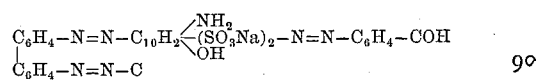

*with one molecule metatoluylenediamin.*—To the intermediate product suspended in liquid is added an aqueous solution of 6.5 kilograms metatoluylenediamin and five kilograms sodium carbonate. At the end of about twelve hours the mixture is heated to the boiling-point, the dyestuff formed precipitated by common salt, and the precipitate collected and dried.

This dyestuff is, in a dry state, a dark powder, scarcely soluble in cold and easily soluble in hot water, with a violet-black coloration, insoluble in alcohol, ether, and benzene. Its solution in concentrated sulfuric acid is dark blue. It dyes unmordanted cotton an intense black in alkaline baths.

The monoazo coloring-matter employed in the described example can be replaced by another monoazo coloring-matter derived from an aromatic diazoaldehyde and one of the amidonaphthol-disulfonic acids 1.8.3.6, 1.8.4.6, 1.5.3.7. On the other hand, for the preparation of the intermediate product the tetrazo derivatives of tolidin, methylbenzidin, ethoxybenzidin, and dianisidin can be substituted for the tetrazodiphenyl. Finally, the metatoluylenediamin can be replaced by other amido compounds—such, for example, as metaphenylenediamin, metaämidophenol, alpha-naphthylamin, alpha-naphthylamin-sulfonic acids 1.4, 1.6, and 1.7, beta-naphthylamin-sulfonic acids 2.5, 2.6, and 2.7, amidonigrotinic acids, amidonaphthols, and the mono and disulfo derivatives of amidonaphthols.

All the trisazo dyestuffs thus produced dye directly unmordanted cotton in tints varying from violet black and blue black to green black.

As derivatives of the diazobenzaldehydes, their constitution may be represented by the following general formula:

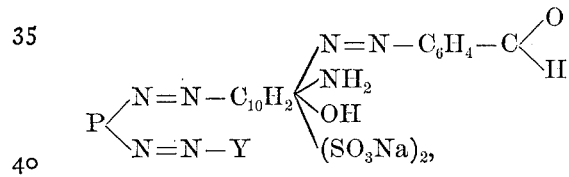

where P stands for the radical of the tetrazo derivative of a diamido base of the series of diphenyl and Y for an amido compound.

These trisazo dyestuffs are, when dried, dark powders of light-bronze luster, soluble in water with violet-black to blue-black coloration, insoluble in alcohol, ether, and benzene. Their solutions in concentrated sulfuric acid are blue.

These trisazo dyestuffs can be condensed with the aromatic hydrazins in solution or upon the fiber.

What we claim is—

1. The herein-described process for the manufacture of new black trisazo dyestuffs, which consists in combining one molecule of the tetrazo derivative of a paradiamido base of the series of diphenyl, with one molecule of a monoazo coloring-matter derived from one molecule of an amidonaphthol-disulfonic acid and one molecule of an aromatic diazoaldehyde, and one molecule of an aromatic amido compound, such for example as metatoluylenediamin, metaphenylenediamin, naphthylamins, naphthylamin-sulfonic acids, amidonaphthols and amidonaphthol-sulfonic acids, as set forth.

2. The herein-described process for the manufacture of new black trisazo dyestuffs, which consists in combining one molecule of the tetrazo derivative of a paradiamido base of the series of diphenyl, with one molecule of the monoazo coloring-matter derived from one molecule amidonaphthol-disulfonic acid 1.8.3.6 and one molecule of paradiazobenzaldehyde and with one molecule of an aromatic amido compound, such for example as metatoluylenediamin, metaphenylenediamin, naphthylamins, naphthylamin-sulfonic acids, amidonaphthols, and amidonaphthol-sulfonic acids, as set forth.

3. The herein-described process for the manufacture of new black trisazo dyestuffs, which consists in combining one molecule of the tetrazo derivative of a paradiamido base of the series of diphenyl, with one molecule of the monoazo coloring-matter derived from one molecule amidonaphthol-disulfonic acid 1.8.3.6 and one molecule of paradiazobenaldehyde and with one molecule of an aromatic metadiamin.

4. As a new article of manufacture, the herein-described black trisazo dyestuff, which is, in its dry state, a dark powder of a light-bronze luster, insoluble in alcohol, ether and benzene, soluble in water with violet-black to blue-black coloration and capable of dyeing unmordanted cotton violet black to green black and which, when dissolved in concentrated sulfuric acid, imparts a blue coloration to the solution, as set forth.

In witness whereof we have hereunto signed our names in the presence of two subscribing witnesses.

JAKOB SCHMID.
KARL JEDLICKA.

Witnesses:
GEORGE GIFFORD,
AUGUST ROOS.